US012576740B1

(12) United States Patent
Smith et al.

(10) Patent No.: US 12,576,740 B1
(45) Date of Patent: Mar. 17, 2026

(54) ELECTRIC VEHICLE CHARGING STATION

(71) Applicant: Energy Helm Inc., Colton, CA (US)

(72) Inventors: Kevin Smith, Colton, CA (US); Chase Miller, Colton, CA (US)

(73) Assignee: Energy Helm, Colton, CA (US)

( * ) Notice: Subject to any disclaimer, the term of this patent is extended or adjusted under 35 U.S.C. 154(b) by 0 days.

(21) Appl. No.: 19/243,439

(22) Filed: Jun. 19, 2025

Related U.S. Application Data

(60) Provisional application No. 63/751,664, filed on Jan. 30, 2025.

(51) Int. Cl.
| | |
|---|---|
| *B60L 53/50* | (2019.01) |
| *B60L 53/16* | (2019.01) |
| *B60L 53/302* | (2019.01) |
| *B60L 53/51* | (2019.01) |
| *B60L 53/52* | (2019.01) |
| *B60L 53/53* | (2019.01) |
| *B60L 53/57* | (2019.01) |
| *B60L 53/63* | (2019.01) |
| *H02S 10/20* | (2014.01) |
| *H02S 10/40* | (2014.01) |
| *B62D 63/08* | (2006.01) |

(52) U.S. Cl.
CPC .............. *B60L 53/50* (2019.02); *B60L 53/16* (2019.02); *B60L 53/302* (2019.02); *B60L 53/51* (2019.02); *B60L 53/52* (2019.02); *B60L 53/53* (2019.02); *B60L 53/57* (2019.02); *B60L 53/63* (2019.02); *H02S 10/20* (2014.12); *H02S 10/40* (2014.12); *B62D 63/08* (2013.01)

(58) Field of Classification Search
CPC ...................................................... B60L 53/50

USPC .......................................................... 320/109
See application file for complete search history.

(56) References Cited

U.S. PATENT DOCUMENTS

| | | | | |
|---|---|---|---|---|
| 5,847,537 | A | * 12/1998 | Parmley, Sr. ........... | B60L 8/003 52/79.9 |
| 2010/0060093 | A1 | * 3/2010 | Hunter .................. | F02B 63/044 290/55 |
| 2012/0005031 | A1 | * 1/2012 | Jammer .................. | B60L 53/30 705/16 |
| 2012/0005125 | A1 | * 1/2012 | Jammer .................. | B60L 53/64 705/412 |

(Continued)

FOREIGN PATENT DOCUMENTS

| | | | | |
|---|---|---|---|---|
| WO | WO-2025074149 A1 | * 4/2025 | ......... | H02J 7/00306 |

*Primary Examiner* — Jerry D Robbins
(74) *Attorney, Agent, or Firm* — Innovent Law P.C.; Karima Gulick

(57) ABSTRACT

A self-sustaining charging station configured to be placed in a remote location to charge electric vehicles. The charging station comprises a housing, at least one battery placed in the housing, a voltage converter electrically connected to the battery, a charging port electrically connected to the voltage converter, and one charging device electrically connected to the battery. The voltage converter is operable to receive a first voltage level from the battery and produce a second voltage level as an output. The charging port is connected to an electric vehicle to transfer the electrical energy from the battery to the electric vehicle. The charging device includes solar panels configured to change position and angular orientation to maximize electrical energy generation at the remote location.

18 Claims, 10 Drawing Sheets

(56) References Cited

U.S. PATENT DOCUMENTS

| | | | | |
|---|---|---|---|---|
| 2012/0010894 A1* | 1/2012 | Jammer | G06Q 30/06 | |
| | | | | 320/101 |
| 2012/0271758 A1* | 10/2012 | Jammer | G07F 15/003 | |
| | | | | 701/22 |
| 2013/0076294 A1* | 3/2013 | Smith | B60L 53/51 | |
| | | | | 320/109 |
| 2014/0375272 A1* | 12/2014 | Johnsen | B60L 58/19 | |
| | | | | 320/136 |
| 2018/0069416 A1* | 3/2018 | Brace | F03D 9/00 | |
| 2018/0264955 A1* | 9/2018 | Gupta | G06Q 30/0283 | |
| 2019/0305570 A1* | 10/2019 | Baldwin | B60L 1/006 | |
| 2019/0351783 A1* | 11/2019 | Goei | B60L 53/305 | |
| 2021/0323429 A1* | 10/2021 | Fata | B60L 53/12 | |
| 2021/0362614 A1* | 11/2021 | Carr | B60L 53/665 | |
| 2022/0281346 A1* | 9/2022 | Green | B60L 53/67 | |
| 2023/0022717 A1* | 1/2023 | Sepe, Jr. | B60L 50/40 | |
| 2023/0081083 A1* | 3/2023 | Fisher | H02J 7/0063 | |
| | | | | 320/109 |
| 2023/0101396 A1* | 3/2023 | Kamalakar | B60L 53/51 | |
| | | | | 320/109 |
| 2023/0188082 A1* | 6/2023 | Kuropas | H02S 10/20 | |
| | | | | 320/101 |
| 2023/0234462 A1* | 7/2023 | Messina | B60L 53/12 | |
| | | | | 320/109 |
| 2023/0294533 A1* | 9/2023 | Burchfield | B60L 53/64 | |
| | | | | 307/9.1 |
| 2023/0294540 A1* | 9/2023 | Mazurek | B60L 53/57 | |
| | | | | 320/109 |
| 2023/0415592 A1* | 12/2023 | Fisher | H02J 7/0063 | |
| 2024/0025286 A1* | 1/2024 | Wang | H02J 7/35 | |
| 2024/0149725 A1* | 5/2024 | Wheatley | H02S 20/32 | |
| 2024/0149726 A1* | 5/2024 | Martin | H01M 10/441 | |
| 2024/0181914 A1* | 6/2024 | Schneider | B60L 53/51 | |
| 2024/0294079 A1* | 9/2024 | Podhola | B60L 1/006 | |
| 2024/0408989 A1* | 12/2024 | Gordon | B60L 53/31 | |
| 2025/0010742 A1* | 1/2025 | Fisher | B62D 61/12 | |
| 2025/0042282 A1* | 2/2025 | Speidel | H02S 20/32 | |
| 2025/0100409 A1* | 3/2025 | Schmidt Poyner | E04H 1/1205 | |

* cited by examiner

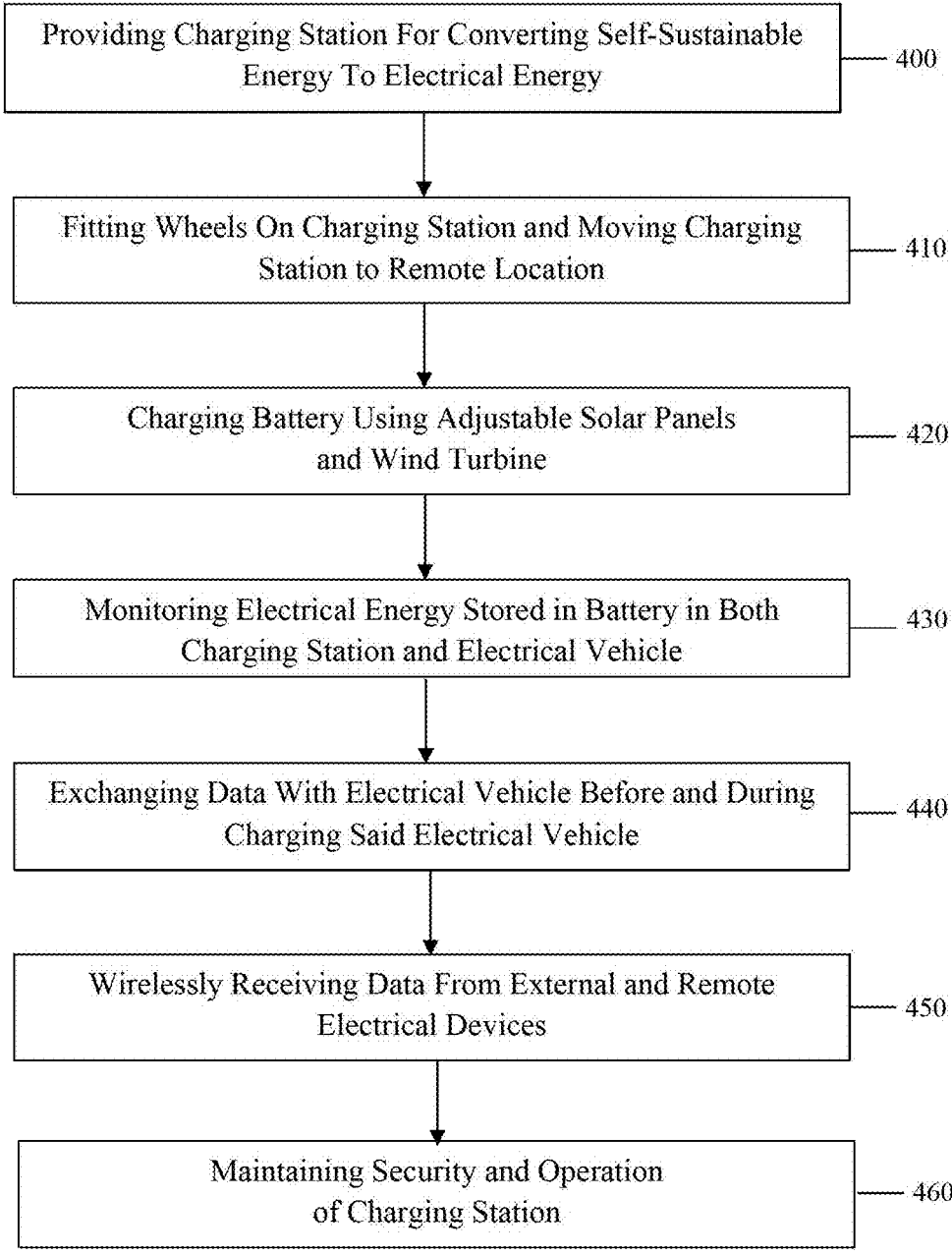

Providing Charging Station For Converting Self-Sustainable Energy To Electrical Energy — 400

Fitting Wheels On Charging Station and Moving Charging Station to Remote Location — 410

Charging Battery Using Adjustable Solar Panels and Wind Turbine — 420

Monitoring Electrical Energy Stored in Battery in Both Charging Station and Electrical Vehicle — 430

Exchanging Data With Electrical Vehicle Before and During Charging Said Electrical Vehicle — 440

Wirelessly Receiving Data From External and Remote Electrical Devices — 450

Maintaining Security and Operation of Charging Station — 460

FIG. 10

ELECTRIC VEHICLE CHARGING STATION

CROSS-REFERENCE TO RELATED APPLICATION

This application incorporates by reference and claims the benefit of priority to U.S. Provisional Application 63/751,664 filed on Jan. 30, 2025, incorporated hereby in its entirety.

BACKGROUND OF THE INVENTION

1. Field of the Invention

The invention relates to a charging station configured to charge electric vehicles. More specifically, the invention relates to a self-sustaining charging station configured to be placed in a remote location to charge electric vehicles.

2. Description of the Related Art

In contemporary times, hybrid electric vehicles have become profuse around the world. These fuel saving designs have become popular because of their high mileage characteristics. However, certain vehicle manufacturers have moved to design and implement pure electric powered vehicles. These vehicles have eliminated the necessity for gasoline or diesel engines as part of the design. A drawback to this apparent progress, however, is the necessity of recharging these vehicles from time to time; thereby limiting the distance they are able to travel. The introduction of advanced battery chemistries resulting in lighter and more powerful batteries has helped somewhat, but has not provided a cure-all for this shortcoming. To alleviate this situation, fixed location electric vehicle charging stations are being constructed along many routes of our highway system. These charging stations derive their power from the grid or in the case of a prior art design, Brace et al (US20180069416) which discloses such a charging station utilizing two or more power sources, including solar and wind derived energy.

When not traveling great distances, the users of electric vehicles can recharge them at their residences, using high cost electrical energy, which can equal or surpass the cost of the previously used fuels, such as gas, diesel, or natural gas. However, for electric vehicles moving in certain terrains (such as deserts) that are away from highway and thus have no access to conventional charging station, charging electric vehicles becomes a vital problem for the viability of operating the electric vehicles in the remote locations.

What is needed is a mobile, electric vehicle power charging device that has the ability to operate off grid and the capability to charging its own batteries while operating stationary in a remote location.

BRIEF DESCRIPTION OF THE DRAWINGS

It should be noted that the drawing figures may be in simplified form and might not be to precise scale.

FIG. 10 is a flow chart of a method of charging an electric vehicle in a remote location according to a fourth embodiment of the present disclosure.

DETAILED DESCRIPTION OF THE INVENTION

The embodiment and various other embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
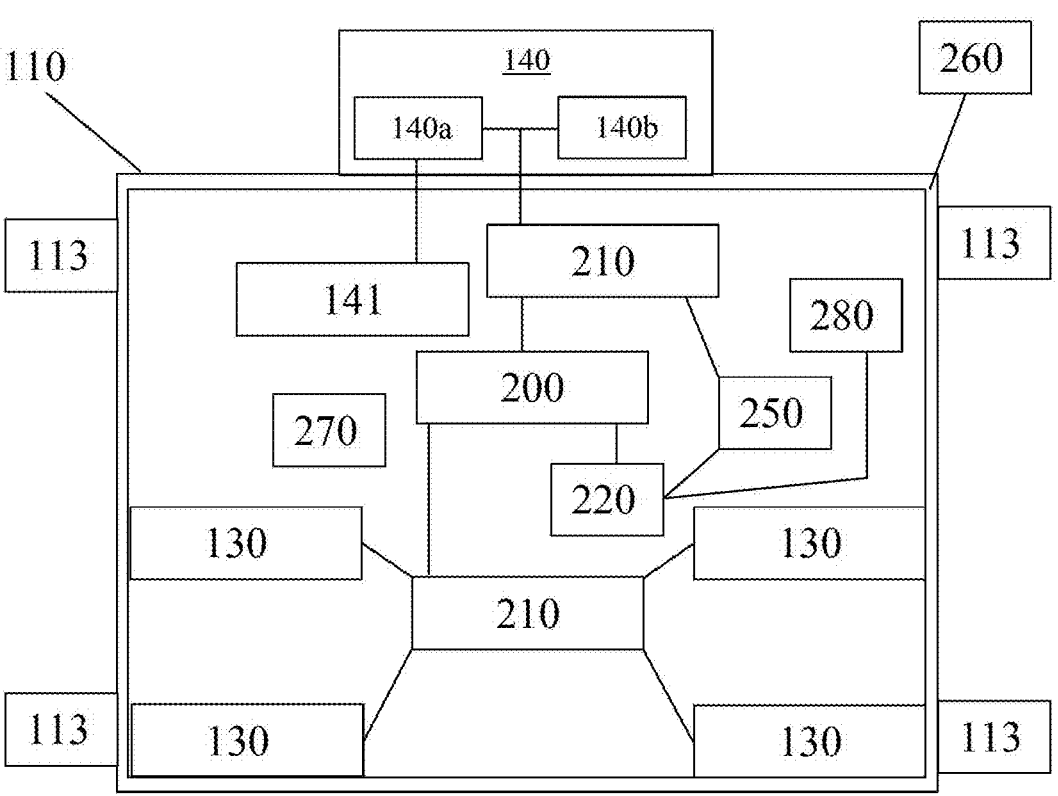
FIG. 1 is a block diagram of the charging station according to the first embodiment of the present disclosure.
Figure 2:
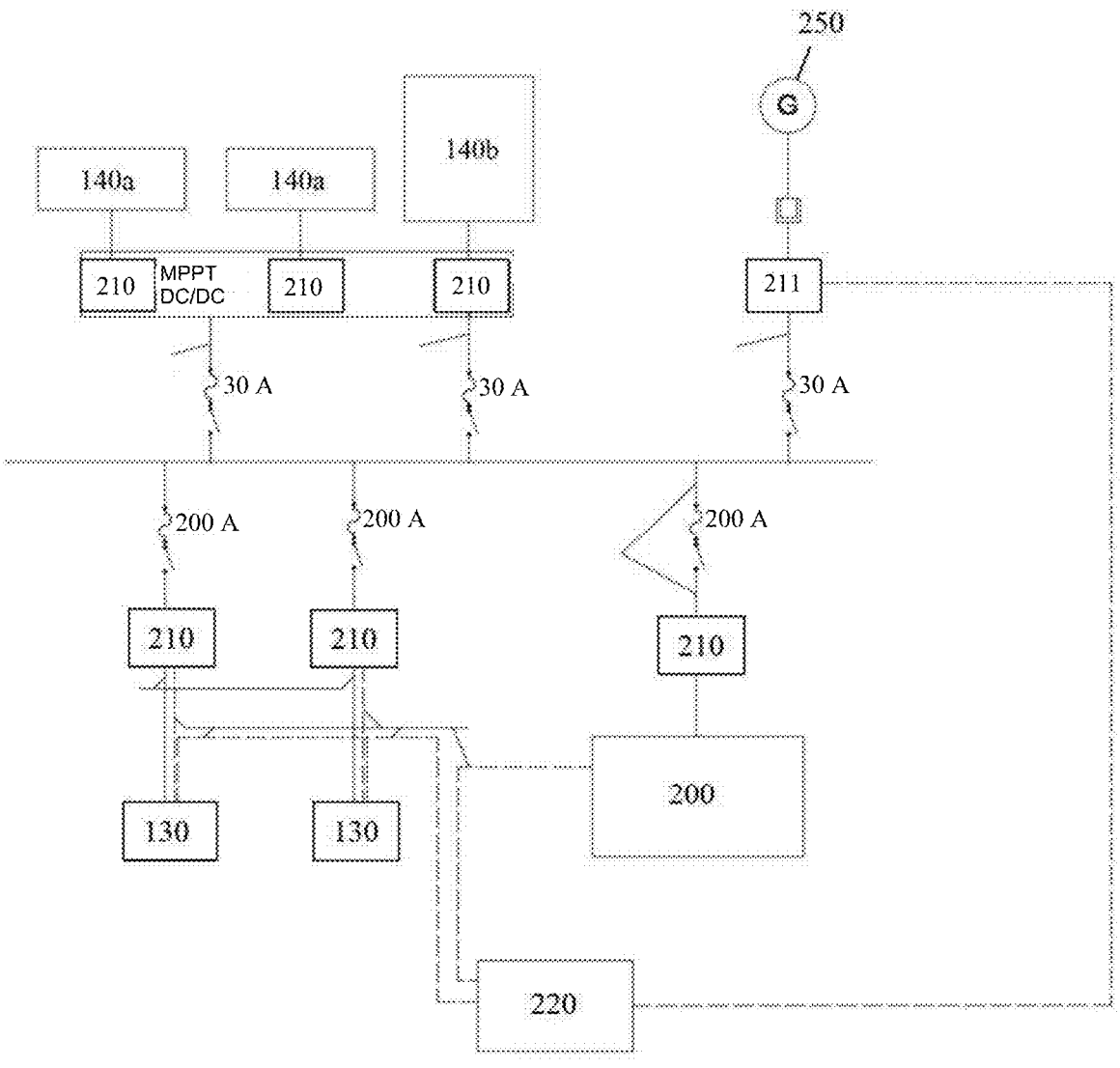
FIG. 2 is a schematic diagram of the electrical energy system of the charging station according to the first embodiment of the present disclosure.
Figure 3:
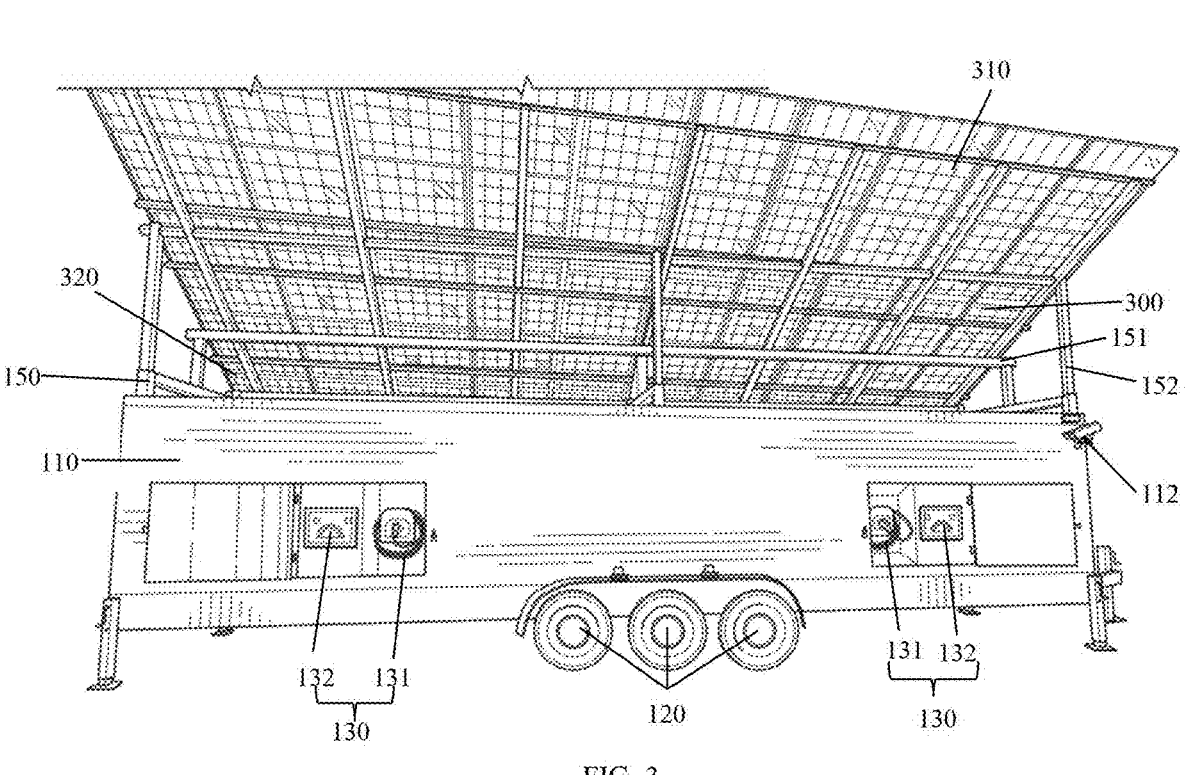
FIGS. 3-6 are a perspective views of the charging station according to a second embodiment of the present disclosure.
Figure 4:
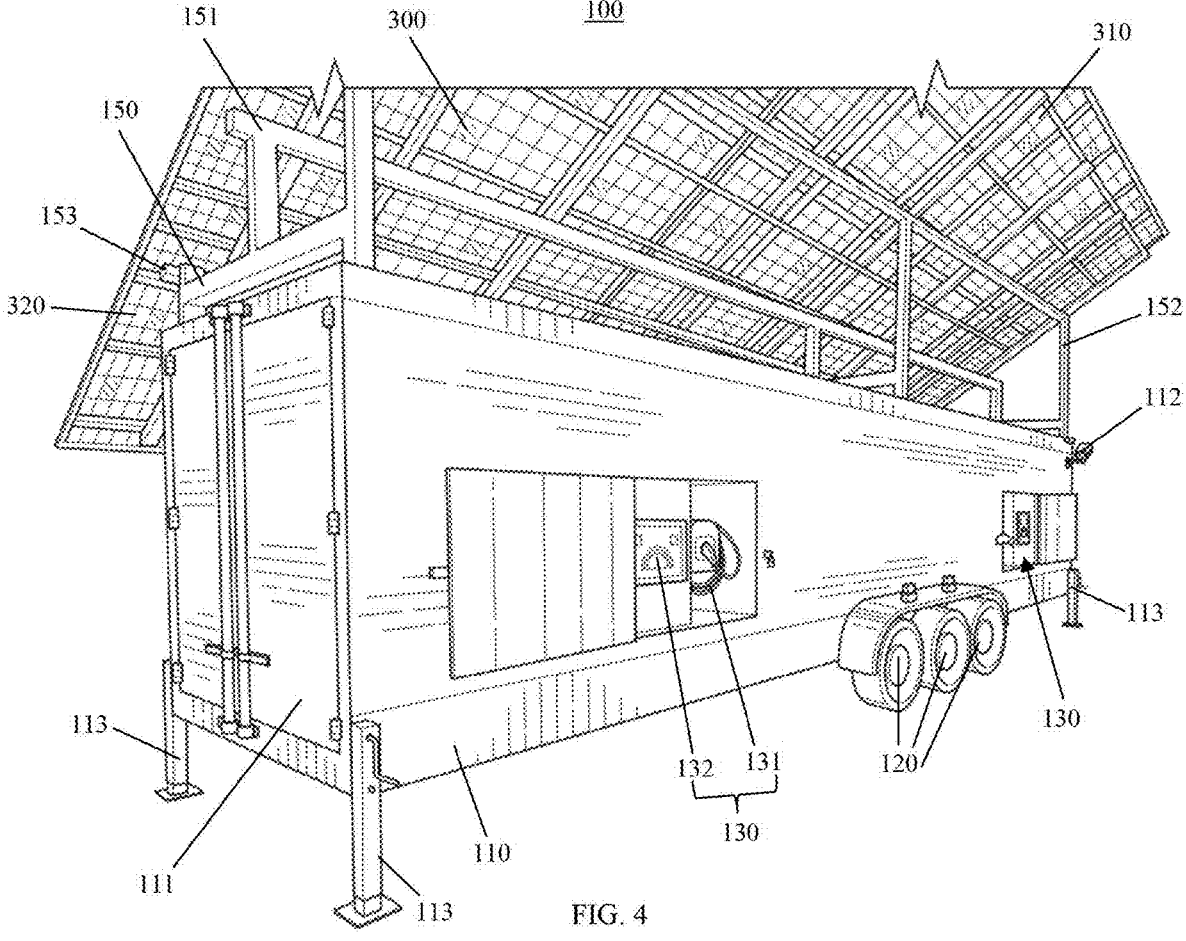
Figure 5:
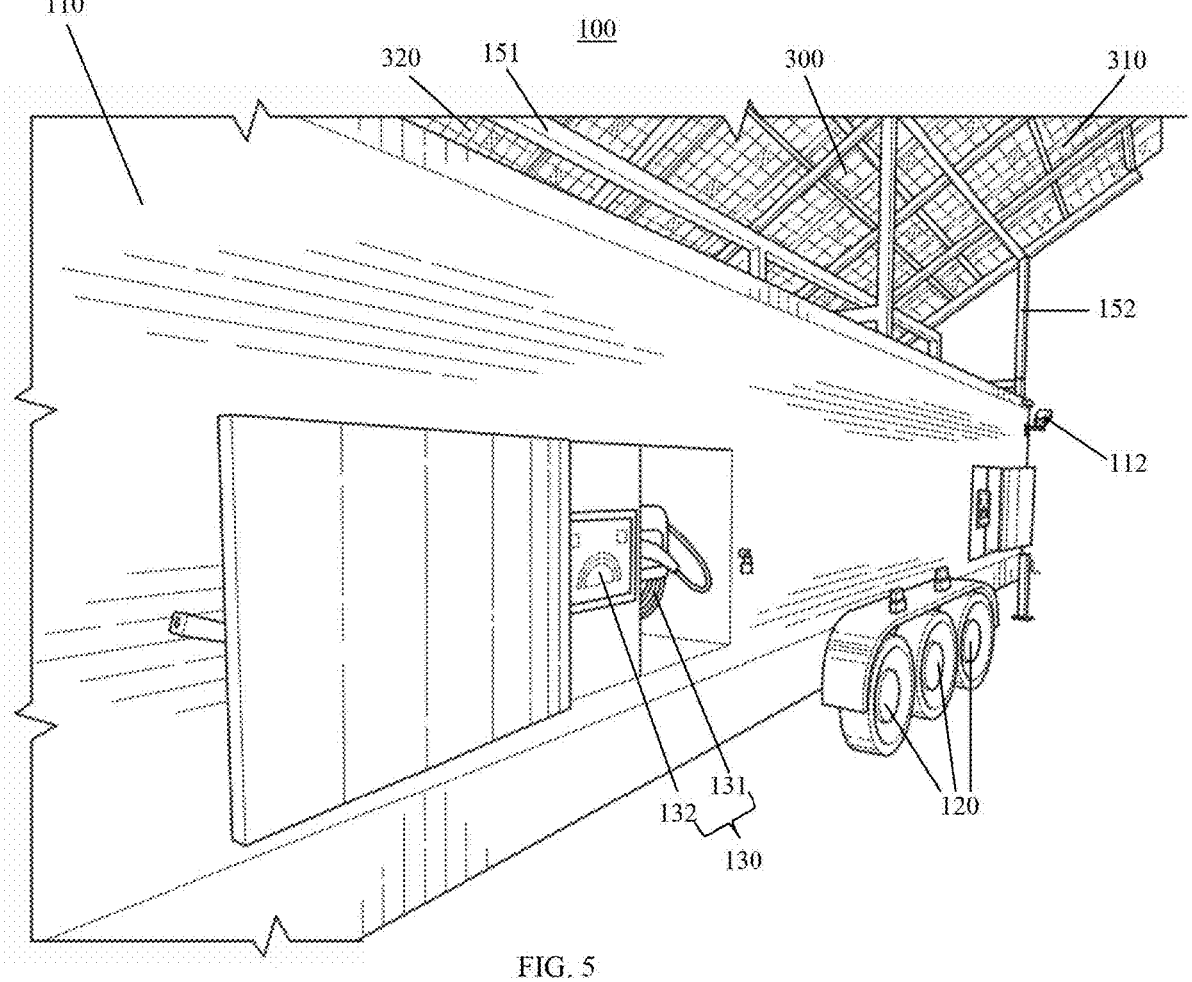
Figure 6:
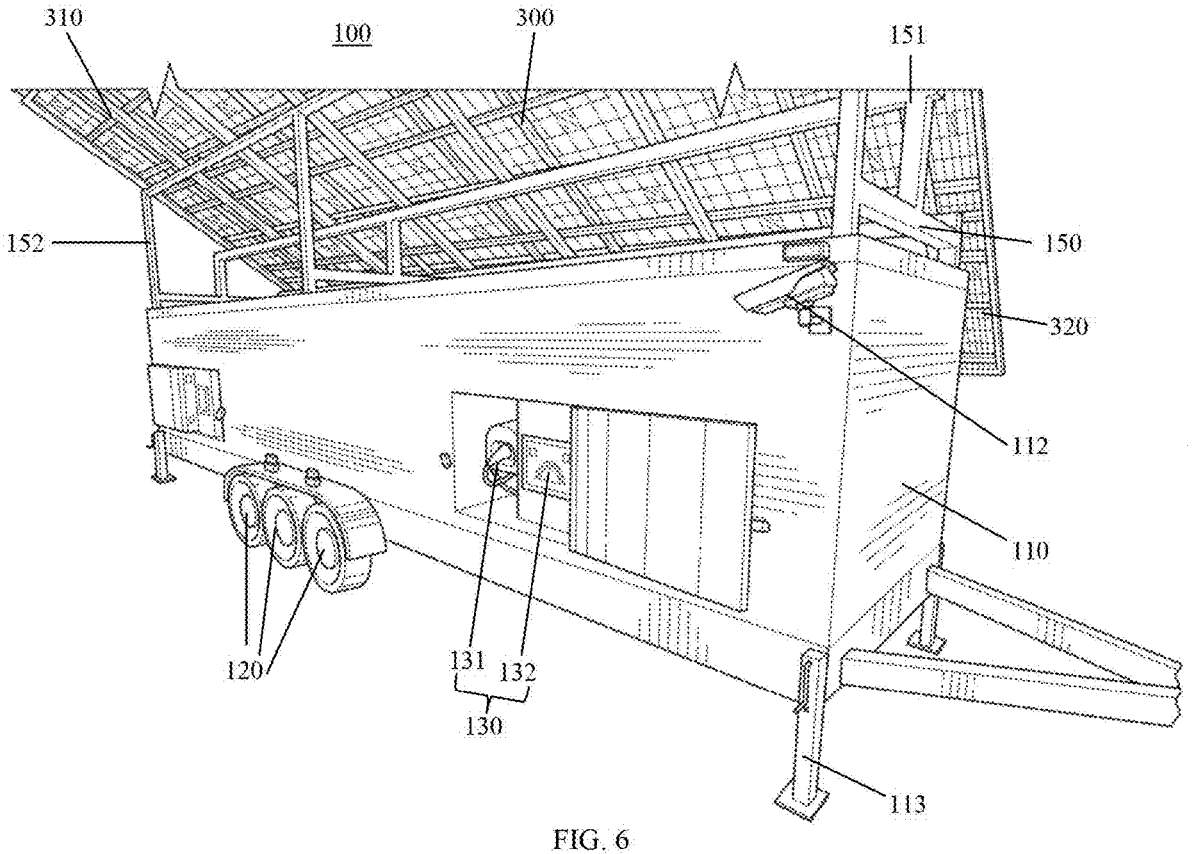

FIG. 1 is a block diagram of the charging station 100 according to the first embodiment of the present disclosure. FIG. 2 is a schematic diagram of the electrical energy system of the charging station 100. The charging station 100 makes use of self-sustainable energy such as sunlight and wind to generate electric energy and store said electric energy in batteries to both operate the hardware of the charging station 100 and charge electric vehicles. The charging station 100 includes a housing 110, a battery system 200 disposed inside the housing 110, a charging device 140 electrically connected to the battery system 200 and disposed outside the housing 110. The battery system 200 of the first embodiment is an industrial battery bank configured to store 250 kWh of electrical energy later used to charge electric vehicle's battery.

In one embodiment, the charging device 140 includes at least one solar panel 140a that converts sunlight (i.e., environmental source) into electrical energy to charge the battery system 200. In another embodiment, the charging device 140 can further include a wind turbine 140b configured to convert the kinetic energy of wind (i.e., environmental source) into electrical energy in order to charge the battery system 200. The standard voltage of a solar panel 140a is between 12 and 24 volts in direct current (DC). The voltage output of the solar panel 140a array depends on the number of modules connected in series. For example, if four 100 watt solar panels 140a are wired in series, each solar panel will put out 20 volts and 5 amps. To find the total array voltage, add the 20 volts together, resulting in 80 volts. For example, a 12 volt solar panel has a rated terminal voltage of around 17.0 volts, but a regulator can reduce this voltage to around 13 to 15 volts for battery charging. On the other hand, the standard voltage of the wind turbine 140b is between 12 and 48 volts in direct current (DC).

The charging station 100 further includes a power converter 210 electrically connected to the charging device 140 and the battery system 200. The power converter 210 is operable to receive a first voltage level as an input and produce a second voltage level as an output. In the first embodiment, the power converter 210 accepts the DC output voltage from the charging device 140 and produce an output voltage most suitable to charge the battery system 200. Further, the power converter 210 makes use of Maximum Power Point Tracking (MPPT) technique to detect in real time the generated voltage of charging device 140 and track the maximum voltage and current product values (the power), so that the charging device 140 could charge the battery system 200 with the maximum power output.

The charging station 100 is designed to be mobile and relocated to different remote locations. Thus, it is important for the charging station 100 to be able to adjust the position and orientation of the charging device 140 in order to maximize the generation of electrical energy at any remote location. The charging station 100 further includes position adjuster 141 coupled with at least the solar panel 140a of the charging device 140 and configured to change the position and angular orientation of the solar panel 140a to adjust for the season, weather, direction of sunlight, wind direction, and other environmental conditions of the remote location where the charging station 100 is located. In the first embodiment, the charging device 140 are solar panel 140a that converts sunlight into electrical energy to charge the battery system 200. Since the sun is always in the southern half of the sky (in the northern hemisphere), solar panels 140a that face south will receive the most direct sunlight. The position adjuster 141 is configured to move the solar panels 140a to directly face the sunlight for maximum electrical energy generation.

In the first embodiment, the position adjuster 141 includes at least two configurations, namely manual solar tracking configuration and active solar tracking configuration. Manual trackers require someone to physically adjust the panels at different times throughout the day to follow the sun. This may not always practical, as you need someone present at the charging station 100 to constantly monitor the sun and change the position of the solar panel 140a. Active trackers rely on motors or hydraulic cylinders to change position. The motors in active trackers will move the solar panel 140a so they are facing directly at the sun. Active solar tracking can be either a single-axis solar tracker or dual-axis solar tracker. The single-axis tracker follows the position of the sun as it moves from east to west. On the other hand, the dual-axis solar tracker not only tracks the sun as it moves cast to west but also follows it as it moves from north to south.

The charging station 100 also includes a charging port 130 electrically connected to another power converter 210. The charging station 100 is configured to charge the battery of an electric vehicle at a voltage ranging from 200V-1000V DC. In the present embodiment, the power converter 210 accepts the output voltage from the battery system 200 and produce a second higher voltage level as an output to charge the electric vehicle's battery.

The charging station 100 further includes a site controller 220 electrically connected to the battery system 200 to monitor the charge level of the battery system 200. In the first embodiment, the electrical energy stored in the battery system 200 is also used to operation the electrical devices of the charging station 100 and thus it is important and preferable to prioritize maintaining operation of the electrical devices in the charging station 100 over charging external electric vehicles. Thus, the site controller 220 is also electrically connected to the charging ports 130, so that the site controller 220 can instruct the charging port 130 to stop charging any electric vehicle if the charge level of the battery system 200 falls below a minimum level (for instance 20% of full capacity) to make sure that there is always enough energy to operate the electrical devices of the charging station 100.

The charging station 100 also includes a redundancy generator 250 disposed in the housing 200 electrically connected to the power converter 210 and the site controller 220. Generally, the battery charging station 100 is responsible for making use of self-sustainable energy such as sunlight and wind to generate electric energy and store said electric energy in the battery system 200 to operate the various electrical devices of the charging station 100 and charge electric vehicles' batteries. In some embodiments, the redundancy generator 250 is a propane generator. However, there may be occasions where the self-substantiable energy is not available or insufficient to generate the minimum electric energy required to even operate the hardware of the charging station 100. The site controller 220 can be configured to turn on the redundancy generator 250 to generate electric energy to charge the battery system 200 and ensure that its charge level does not fall below a minimum level required to operate the electrical devices of the charging station 100.

The charging station 100 includes thermal insultation 260 placed in the housing 200 to serve as a barrier to reduce the heat transfer between the interior of the housing 200 and the external environment. The thermal insulation 260 includes high-density pre-produced foam blocks made of polystyrene (EPS) or polyurethane, mineral wool, cellulose, fiberglass or other thermal insulating materials. The charging station 100 also includes a temperature regulator 270 electrically connected to the site controller 220 and configured to regulate the temperature inside the housing 110 to maintain the operation of the battery system 200 and other electrical devices of the charging station 100. The temperature regulator 270 is preferably configured to provide heating when the charging station 100 is located in a remote location of low temperature and cooling when the charging station 100 is located in a remote location of high temperature. In different embodiments, the temperature regulator 270 can be configured to only provide heating or cooling.

The charging station 100 also includes a communication device 280 electrically connected to the site controller 220 and configured to wirelessly communicate with external devices to receive data. The above-mentioned external devices include servers of the National Weather Service to receive information on weather report or the owner of the charging station 100 to receive instructions regarding operation of the charging station 100. The communication device 280 is also configured to transmit data to the external devices. For example, the communication device 280 can transmit historical data on the charge level of the battery system 200 and operation of the charging device 140 (such as rate of generating electrical energy) to the owner of the charging station 100 for monitoring the operation of the charging station 100. Further, the communication device 280 can perform long-range wireless data transmission and includes radio wireless technology using electromagnetic waves with wavelengths longer than 30 centimeters, cellular technologies such as the fifth generation cellular technology, satellite technology, microwave wireless technology such as WiMAX that uses electromagnetic waves with wavelengths ranging from about 30 centimeters to one millimeter, and Long Range Low Power (LRLP) wireless networks.

The charging station 100 further includes a plurality of stabilizer 113 configured to couple the housing 110 with the ground in order to stabilize the charging station 100 in the remote location. The stabilizer 290 includes jack stands, tripod stabilizers, long RV stabilizers, slide-out stabilizers and other device designed to reduce sway and movement of the charging station 100 under severe circumstances such as high-winds.

FIGS. 3-6 are a perspective views of the charging station 100 according to a second embodiment of the present disclosure. The charging station 100 is configured to be self-sustaining in order to be placed in a remote location (such as an open desert) to charge electric vehicles. The charging station 100 makes use of self-sustainable energy such as sunlight and wind to generate electric energy and store said electric energy in batteries to both operate the hardware of the charging station 100 and charge electric vehicles. The charging station 100 includes a housing 110, a plurality of wheels 120 attached to the housing 110, a plurality of charging ports 130 disposed on the housing 110, and a plurality of solar panels 300, 310, 320 located above the housing 110. In some embodiments, the charging station 100 includes wind turbines In the second embodiment, the housing 110 contains the batteries and other hardware configured to charge electric vehicles through the charging port 130. The housing 110 includes doors 111 that allows users to enter the housing 110 to modify said batteries and other hardware inside the housing 110. The doors 111 preferably includes locks such as deadbolt door locks or electronic locks that only allow people with the corresponding key or access code to open the door and gain access to the interior of the housing 110. In addition to the doors 111, the charging station 100 further includes at least one security camera 112 disposed on the housing 110 to monitor the environment around the charging station 100. One security camera 112 can be disposed near the doors 111 to monitor for forced entry into the housing 110. Another security camera 112 can be disposed on two opposite sides of the housing 110 to monitor the charging ports 130.

On the other hand, the wheels 120 allows the housing 110 to be moved by a vehicle (such as a container chassis) to the remote location. The housing 110 further includes a plurality of movable stands 113 configured to move between a horizontal orientation when the housing 110 is in transmit and a vertical orientation as illustrated in FIGS. 3-6 once the housing 110 arrives at the remote location. The user can then lock down the stands 113 to the ground for them to remain in the vertical orientation to and support and stabilizer the housing 110.

In the first embodiment, the charging station 100 includes four charging ports 130, wherein two charging ports 130 are disposed on two opposite sides of the housing 110. The charging ports 130 are configured to output direct current (DC) current in order to charge electric vehicle at the power between 50 kw and 350 kw. The output voltage at the charging ports 130 are preferably ranging from 400V-1000V DC. Each of the charging port 130 includes a charging cable 131 and a user display 132. The charging cable 131 is connected to a power converter 210 (illustrated in FIGS. 1 and 2) inside the housing 110, wherein the power converter 210 accept a first voltage from the battery and generate a higher second voltage as its output. Thus, the output voltage from the charging cable 131 is the higher second voltage that can range from 400V-1000V DC. Similarly, the power converter 210 outputs higher power (e.g., current), preferably between 50 kW and 350 kW. More specifically, the power converter 210 receives a first power level and changes (e.g., amplifies) it to output a second power level, such that the second power level is at least partially greater than the first power level. In other words, the power converter 210 outputs different power output based on its configuration. Preferably, the power converter 210 operates at a Level 3 charging level. That is, the charging station 100 is preferably a Level 3 charger. As such, the power converter 210 outputs 50 kW to 350 kW DC current. However, in some embodiments, the output of the power converter 210 is based on power remaining in the battery system 200, charging needs of the electric vehicle connected to at least one of the charging ports 130, battery charging capability of the electric vehicle (e.g., compatibility with charging level, such as Level 3 charger), and the like.

On the other hand, the user display 132 is connected to a controller 220 (illustrated in FIGS. 1 and 2) disposed inside the housing 110 and electrically connected to the battery system 200 to determine the status of the battery such as the remaining charges (electrical energy) of the battery system 200. The controller 220 also measures the rate of electrical energy transferred from the battery system 200 to the battery of the electric vehicle, determine the remaining time to finish charging, and show said information on the display 132. In some embodiments, the controller 220 adjusts a conversion level of the power converter 210. In particular, in some embodiments, the controller 220 changes the power converter 210 to operate at a different power level than the Level 3 charging level. Specifically, at a Level 1 charging level, the controller 220 adjusts the power converter 210 to output a power level between 1.3 kW to 2.4 kW AC current. Moreover, at a Level 2 charging level, the controller 220 adjusts the power converter 210 to output a power level between 3 KW to 20 KW AC current. It will be appreciated that while only Level 1 to Level 3 charging level has been described, the controller 220 can be adjusted for higher charger levels (e.g., Level 4, Level 5, etc.) that is known or may become known to one of ordinary skill in the art.

In the present embodiment, the controller 220 is configured to establish data communication with the electric vehicle either through the charging cable 131 or wirelessly with the wireless communication device of the electric vehicle. The controller 220 can then receive data from the electric vehicle to learn the current energy capacity of the battery on the electric vehicle and then determine the time required to fully charge the electric vehicle's battery. The controller 220 can then show the above-mentioned information on the user display 132. In some embodiments, the controller 220 sends commands to at least one of the plurality of charging ports 130 to discharge at 1000V DC when the electric vehicle is above a threshold level for charging (e.g., low battery, 20% charge).

Furthermore, in some embodiments, the controller 220 may interact with an external program, such as, for example, a software application (e.g., an app) on a computing device (e.g., a mobile phone, a smartphone, a laptop computer, a desktop computer, a tablet computer, a smart watch, etc.). In other words, the controller 220 receives data and/or commands from the computing device executing the app. In this manner, the controller 220 transmits the same information communicated from the electric vehicle (e.g., charging information) to the app on the computing device. Additionally, the controller 220 sends remaining power available at the charging station 100 for charging the electric vehicle on the app.

The solar panels of the second embodiment are dividing into three sections, namely a first panel 300, a second panel 310, and a third panel 320, wherein the second and third panels 310, 320 are located on two opposite sides of the first panel 300. Each of the panels 300-320 includes arrays of photovoltaic (PV) cells that convert sunlight into electrical energy. The PV cells are made of materials that produce excited electrons when exposed to light and also electrically connected to the batteries stored inside the housing 110. The electrons flow through a circuit and produce direct current (DC) electrical energy, which can be used to charge said battery system 200 inside the housing 110.

The charging station 100 further including a panel mount 150 coupled with the first, second, and third panels 300-320. The panel mount 150 includes a first mount 151 coupled with the first panel 300, a second mount 152 coupled with the second panel 310, and a third mount 153 coupled with the third panel 320, wherein at least the second and third mounts 152-153 are configured to moved vertically. Further, the first panel 300 is rotatably coupled with the first mount 151. The second panel 310 is rotatably coupled with the second mount 152. The third panel 320 is rotatably coupled with the third mount 153. Thus, the panel mount 150 can change the angular orientation of the three panels 300-320 by vertically moving the mounts 152-153 and rotating the panels 300-320.

As illustrated in FIGS. 3-6, the three panels 300-320 are tilted at an angle. The panels 300-320 can be moved to a position where they are all parallel with the ground by moving the second and third mounts 152-153 to the same height as the first mount 151. As mentioned above, the panels 300-320 are rotatably coupled with the corresponding mounts 151-153. Further, the second and third panels 142-143 are respectively coupled with the two opposites sides of the first panel 300. Thus, as the second mount 152 is moved vertically upward and the third mount 153 is moved vertically downward to reach the same height as the first mount 151, the panels 300-320 are rotated with respect to the corresponding mounts 151-153 till the panels 300-320 are parallel with the ground.

Figure 7:
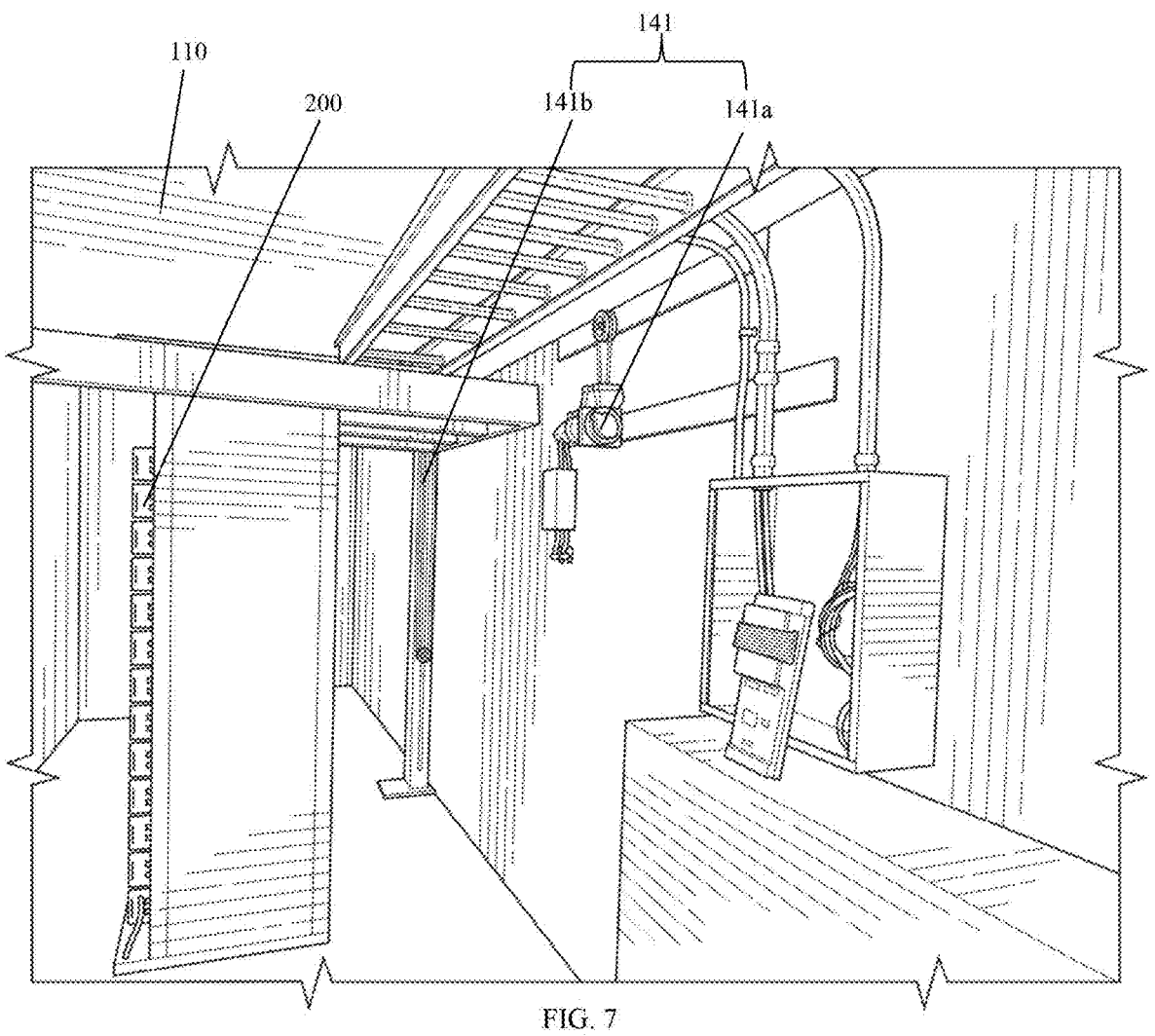
FIG. 7 is a perspective view of the interior of the housing according to the second embodiment of the present disclosure.

FIG. 7 is a perspective view of the interior of the housing 110 according to the second embodiment of the present disclosure. As illustrated in FIG. 7, the housing 110 contains the battery system 200 as an industrial battery bank configured to store 250 kWh of electrical energy later used to charge electric vehicle's battery. The position adjuster 141 includes a winch 141a electrically connected to the battery system 200 and a pulley system 141b coupled with the winch 141a. Further, the pulley system 141b is coupled with the second mount 152 outside the housing 110 and illustrated in FIGS. 3-6. The winch 141a has a wire rope coupled with the pulley system 141b and can be driven by the electrically energy of the battery system 200 to move the pulley system 141b and in the process elevate the telescopic mast as well as the associated second mount 152. Similarly, the charging station 100 includes another set of winch 141a and pulley system 141b installed on the wall opposite to the position adjuster 141 illustrated in FIG. 7, wherein the other set of winch 141a and pulley system 141b are coupled with the third mount 153 outside the housing 110 and illustrated in FIGS. 3-6. The other set of winch 141a and pulley system 141b can be driven by the electrically energy of the battery system 200 to move the pulley system 141b and in the process elevate the telescopic mast as well as the associated third mount 153.

Figure 8:
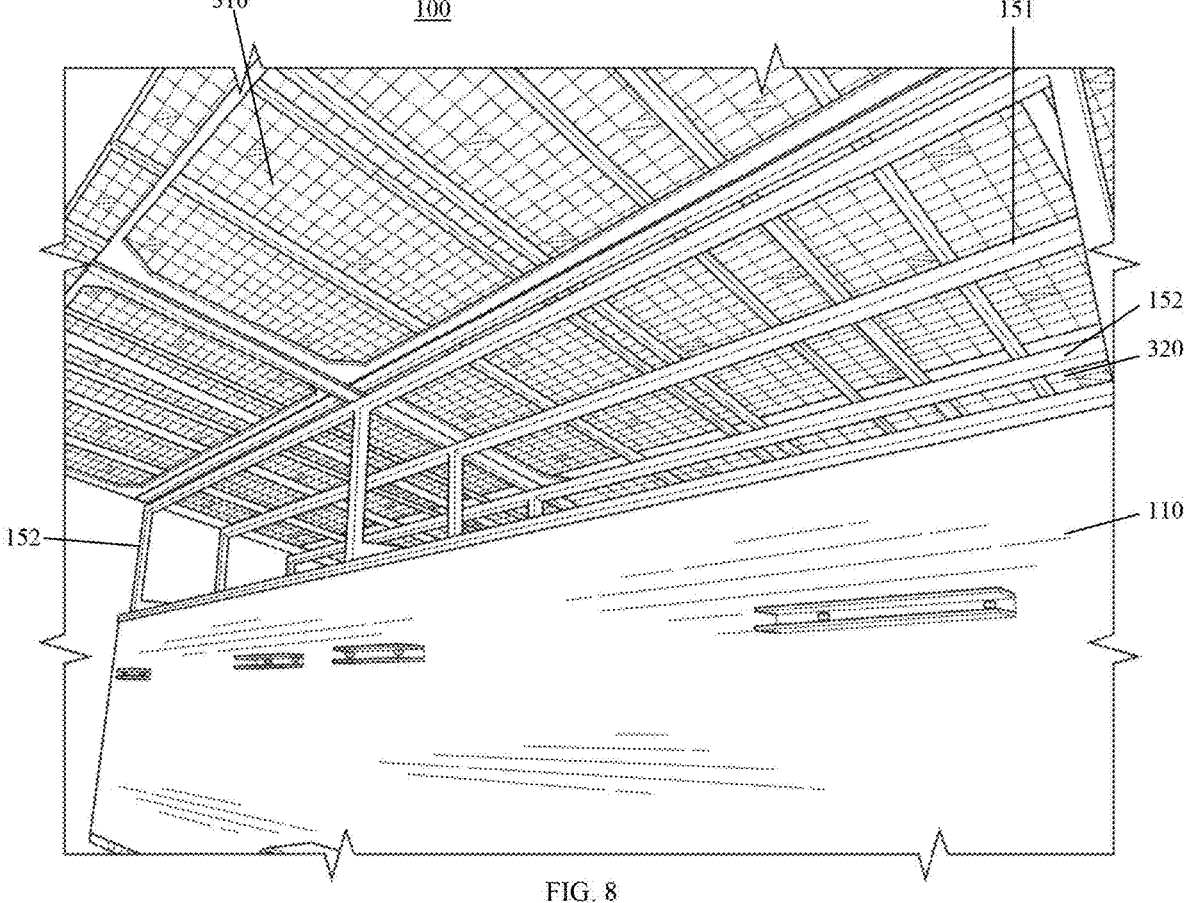
FIGS. 8-9 are perspective views of the charging station according to a third embodiment of the present disclosure.
Figure 9:
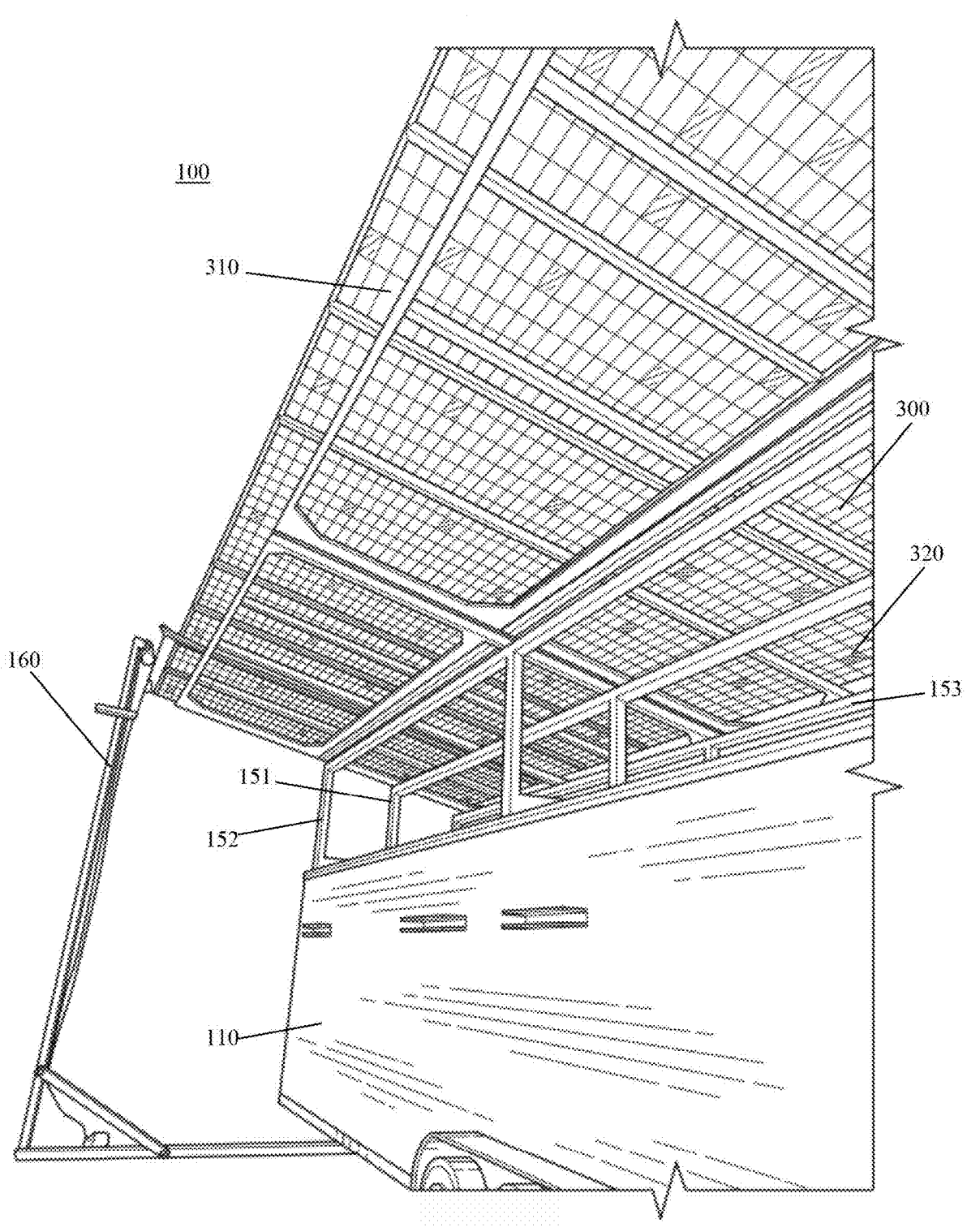

FIGS. 8-9 are perspective views of the charging station 100 according to a third embodiment of the present disclosure. In the present embodiment, the second panel 310 and the third panel 320 are rotatably coupled with the second mount 152 and third mount 153 respectively, wherein the two panels 310, 320 can rotate in at least 90 degree. The second and third panels 310, 320 are configured to move between: a first position where they are perpendicular to the first panel 300 and the ground; and a second position where they are coplanar with the first panel 300. As illustrated in FIG. 9, the charging station 100 further includes a panel stabilizer 160 coupled with the second panel 310 to stabilize the second panel 310 and maintain its position.

FIG. 10 is a flow chart of a method of charging an electric vehicle in a remote location according to a fourth embodiment of the present disclosure. The method includes step 400 of providing a charging station configured to makes use of self-sustainable energy such as sunlight and wind to generate electric energy and store said electric energy in batteries to operate the hardware of the charging station and charge electric vehicles. The charging station of the fourth embodiment is substantially identical to the charging station 100 illustrated in FIG. 1 and discussed above.

The method further includes step 410 of fitting wheels on the housing of the charging station and moving the charging station to the remote location by a vehicle. The charging station is designed to operate in a remote location (such as desert) away from roads. Thus, the charging station is equipped with wheels in order for a vehicle (such as a container chassis) to move the charging station over rough terrain to reach the remote location.

The method further includes step 420 of charging the battery. The charging station mainly uses solar panels to generate the electrical energy for charging the battery. Thus, step 420 also involves changing the vertical position and angular orientation of the solar panels in order to maximize the electrical energy generation. The charging station is designed to be mobile and relocated to different remote locations. Thus, it is important for the charging station to be able to adjust the position and orientation of the charging device in order to maximize the generation of electrical energy at the specific remote location. The charging station 100 further includes a position adjuster coupled with the solar panels and configured to change the position and angular orientation of the solar panels based on the season, weather, direction of sunlight, wind direction, and other environmental conditions of the remote location where the charging station is located.

In another embodiment, step 420 also includes using wind power generator to supplement the electrical energy generation of the solar panels. Also, there may be occasions where the self-substantiable energy is not available or insufficient to generate the minimum electric energy required to even operate the hardware of the charging station. Thus, step 420 also includes turning on a redundancy generator to generate electric energy to ensure that the charge level of the battery does not fall below a minimum level required to operate the electrical devices of the charging station.

In the present embodiment, the charging device are solar panels that converts sunlight into electrical energy to charge the battery inside the charging station. Since the sun is always in the southern half of the sky (in the northern hemisphere), solar panels that face south will receive the most direct sunlight and, therefore for maximum electrical energy generation. The position adjuster is configured to move the solar panels to directly face the sunlight. Step 420 includes moving the solar panels together as a group or moving individual solar panel separately to face the sun. Step 420 also includes two configurations, namely manual solar tracking configuration and active solar tracking configuration. Manual trackers require someone to physically adjust the solar panels at different times throughout the day to follow the sun. This may not always practical, as you need someone to constantly monitor the sun and change the position of the solar panel system. On the other hand, active trackers rely on motors or hydraulic cylinders to change position. The motors in active trackers will move the solar panel so they are facing directly at the sun. Active solar tracking can be either a single-axis solar tracker or dual-axis solar tracker. The single-axis tracker follows the position of the sun as it moves from east to west. On the other hand, the dual-axis solar tracker not only tracks the sun as it moves cast to west but also follows it as it moves from north to south.

The method further includes step 430 of monitoring electrical energy stored in the battery. In the present embodiment, the electrical energy stored in the battery is also used to operation the electrical devices of the charging station and thus it is important and preferable to prioritize the internal operation of the charging station over charging external electric vehicles. Thus, step 430 involves giving instructions to stop charging any electric vehicle if the charge level of the battery falls below a minimum level (for instance 20% of full capacity) to make sure that there is always enough energy to operate the electrical devices of the charging station.

The method also includes step 440 of exchanging data with the electric vehicle before and during charging of said electrical vehicle. In the present embodiment, the controller is configured to establish data communication with the electric vehicle either through the charging cable or wirelessly with the wireless communication device of the electric vehicle. The controller can then receive data from the electric vehicle to learn the current energy capacity of the battery on the electric vehicle and then determine the time required to fully charge the electric vehicle's battery. The controller can then show the above-mentioned information on the user display.

The method also includes step 450 of wirelessly receiving data from an external and remote electrical devices. The above-mentioned external devices include servers of the National Weather Service to receive information on weather report or the owner of the charging station to receive instructions regarding operation of the charging station. Step 450 also involves transmitting data to the external devices. For example, the communication device can transmit historical data on the charge level of the battery system and operation of the charging device (such as rate of generating electrical energy) to the owner of the charging station for the owner to monitor the operation of the charging station. Further, the communication device is configured to perform long-range wireless data transmission and includes radio wireless technology using electromagnetic waves with wavelengths longer than 30 centimeters, cellular technologies such as the fifth generation cellular technology, satellite technology, microwave wireless technology such as WiMAX that uses electromagnetic waves with wavelengths ranging from about 30 centimeters to one millimeter, and Long Range Low Power (LRLP) wireless networks.

The method also includes step 460 of maintaining the security and operation of the charging station. Step 460 includes generating images of an environment around the housing using security camera. To monitor forced entry, one security camera can be disposed near the doors to monitor for forced entry into the housing. Another security camera can be disposed on two opposite sides of the housing to monitor the security of the charging ports.

Step 460 also involves regulating the temperature inside the housing to prevent the battery from overheating. The charging station includes thermal insultation placed in the housing to serve as a barrier to reduce the heat transfer between the interior of the housing and the external environment. The thermal insulation includes high-density pre-produced foam blocks made of polystyrene (EPS) or polyurethane, mineral wool, cellulose, fiberglass or other thermal insulating materials. The charging station also includes a temperature regulator electrically connected to the site controller and configured to regulate the temperature inside the housing to maintain the operation of the battery system and other electrical devices of the charging station. The temperature regulator is preferably configured to provide heating when the charging station is located in a remote location of low temperature and cooling when the charging station is located in a remote location of high temperature. In different embodiments, the temperature regulator can be configured to only provide heating or cooling.

In industry today, electric vehicle charging stations are categorized into three main levels based on their power output and charging speed. A Level 1 Charging in general uses standard 120V household outlets, has a power output: of about 1.4 to 1.9 kW, and typically a charging speed of 3-5 miles of range per hour. This level of charging is usually best for overnight charging at home, emergency situations and the typical charge time: 8-20+ hours for full battery. A Level 2 Charging uses 240V outlets (like electric dryers), has a power output: between about 3.3 kW to 19.2 KW (most commonly 6.6-7.2 kW), has a charging speed of about 10 to 60 miles of range per hour and is usually best for: Home charging, workplace charging, public destinations. The typical charge time for a regular electric vehicle here is a usually 4-8 hours for full battery. On the other hand, the fastest chargers known in industry today is a Level 3 Charging (DC Fast Charging). This level 3 charger uses high-voltage direct current (DC) power, with a power output of about 50 kW to 350+ kW. This level 3 charging station has a charging speed of about 60-200+ miles of range in 20-30 minutes, and is best for Highway corridors, quick stops, commercial use. The typical charge time is between 20-60 minutes for a battery to 80% capacity. Level 3 chargers bypass the vehicle's onboard AC-to-DC converter and deliver DC power directly to the battery. This allows for much faster charging but requires specialized equipment and higher electrical infrastructure. The charging speed depends on both the charger's maximum output and the vehicle's maximum acceptance rate-whichever is lower becomes the limiting factor. Level 3 charging typically slows down significantly after reaching 80% battery capacity to protect battery health, which is why most people use these chargers for quick top-ups rather than full charges.

The present disclosure is embodied in a self-sustaining level 3 charger which is mobile and adapted to offer high rate charging at any location once deployed.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. A charging station, comprising:

a housing that is movable to a location;

at least one battery disposed within at least a portion of the housing to store power and generate a first voltage;

a power converter connected to the at least one battery to generate a second voltage in response to receiving the first voltage, such that the second voltage operates at a Level 3 charging level;

at least one charging port connected to the power converter and connectable to an electric vehicle, the at least one charging port transfers the power from the at least one battery to an electric vehicle at the Level 3 charging level in response to connecting the at least one charging port to the electric vehicle; and at least one charging device connected to the at least one battery to charge the at least one battery based on at least one environmental source, the at least one charging device comprises:

a first solar panel disposed a distance away from the housing and configured to perpendicularly move toward or away from the housing with respect to a direction, and a second solar panel connected to the first solar panel and movable between a first plane and a second plane, such that the first plane is perpendicular to the second plane.

2. The charging station of claim 1, further comprising a position adjuster connected to the first solar panel and the second solar panel, the position adjuster configured to move the first solar panel, and move the second solar panel between the first plane and the second plane.

3. The charging station of claim 2, further comprising:

a controller connected to the at least one battery and the position adjuster, the controller configured to monitor the power remaining in the at least one battery and send at least one of instructions, change positions, and angular orientation to the first solar panel and the second solar panel; and a communication device configured to exchange data with an external device and deliver instructions to the controller from the external device.

4. The charging station of claim 3, wherein the controller monitors the power stored in the at least one battery and prevents the at least one charging port from transferring the power to the electric vehicle based on the power stored in the at least one battery falling below a minimum level.

5. The electric vehicle charging station of claim 3, wherein the at least one charging port discharges at 1000 V DC based on the controller determining the electric vehicle is above a threshold level for charging.

6. The charging station of claim 1, further comprising a redundancy generator connected to the battery and configured to generate power to supplement a electrical energy generation by the charging device.

7. The electric vehicle charging station of claim 1, further comprising:

a temperature insulation disposed within at least a portion of the housing; and a temperature regulator configured to regulate a temperature level inside the housing to prevent the at least one battery from overheating.

8. The electric vehicle charging station of claim 1, wherein the at least one charging device comprises a wind power generator connected to the battery and configured to generate the power to charge the battery in response to receiving wind.

9. The electric vehicle charging station of claim 1, further comprising:

a camera disposed on at least a portion of the housing and configured to generate images of an environment around the housing;

a security sensor disposed on at least a portion of the housing and configured to monitor a forced entry of the housing; and a temperature sensor disposed within at least a portion of the housing and configured to measure a temperature inside the housing.

10. A method, comprising:

fitting wheels on a housing and moving the housing to a location by a vehicle;

storing power in at least one battery and generating a first voltage;

generating a second voltage at a power converter in response to receiving the first voltage, such that the second voltage operates at a Level 3 charging level;

transferring the power from the at least one battery to an electric vehicle at the Level 3 charging level in response to connecting at least one charging port to the electric vehicle; and charging the at least one battery based on at least one environmental source, the charging the at least one battery comprises:

moving a first solar panel toward or away from the housing with respect to a direction, and moving a second solar panel between a first plane and a second plane, such that the first plane is perpendicular to the second plane.

11. The method of claim 10, wherein moving the first solar panel and the second solar panel comprises moving the first solar panel and the second solar panel based on movement of a position adjuster.

12. The charging station of claim 10, further comprising:

monitoring the power remaining in the at least one battery and sending at least one of instructions, changing positions, and angular orientation to the first solar panel and the second solar panel; and exchanging data with an external device and delivering instructions from the external device.

13. The method of claim 12, wherein monitoring the power remaining in the at least one battery comprises monitoring the power stored in the at least one battery and preventing transfer of the power to the electric vehicle based on the power stored in the at least one battery falling below a minimum level.

14. The method of claim 10, wherein transferring the power from the at least one battery comprises discharging at 1000 V DC based on determining the electric vehicle is above a threshold level for charging.

15. The method of claim 10, further comprising generating power at a redundancy generator to supplement electrical energy generation by the charging device.

16. The method of claim 10, further comprising regulating a temperature level inside the housing to prevent the at least one battery from overheating.

17. The method of claim 10 wherein charging the at least one battery based on at least one environmental source comprises generating the power to charge the at least one battery in response to receiving wind.

18. The method of claim 10, further comprising:
generating images of an environment around the housing;
monitoring a forced entry of the housing; and
measuring a temperature level inside the housing.

\* \* \* \* \*